United States Patent
Rainous et al.

(10) Patent No.: US 8,245,981 B2
(45) Date of Patent: Aug. 21, 2012

(54) ICE SHED REDUCTION FOR LEADING EDGE STRUCTURES

(75) Inventors: Edward Atwood Rainous, Cincinnati, OH (US); Barry Lynn Allmon, Maineville, OH (US); Jeffre Gerry Loewe, Cincinnati, OH (US); William Clarke Brooks, Lebanon, OH (US); Lee Alan Blanton, Cincinnati, OH (US); Courtney James Tudor, Cincinnati, OH (US); Vicky Showalter Budinger, Loveland, OH (US)

(73) Assignee: General Electric Company, Schenectady, NY (US)

( * ) Notice: Subject to any disclaimer, the term of this patent is extended or adjusted under 35 U.S.C. 154(b) by 1148 days.

(21) Appl. No.: 12/112,733

(22) Filed: Apr. 30, 2008

(65) Prior Publication Data
US 2009/0272850 A1  Nov. 5, 2009

(51) Int. Cl.
*B64C 21/00* (2006.01)
*B64C 1/38* (2006.01)

(52) U.S. Cl. .................. 244/200.1; 244/130
(58) Field of Classification Search ........... 244/200, 244/130, 200.1
See application file for complete search history.

(56) References Cited

U.S. PATENT DOCUMENTS

| | | | |
|---|---|---|---|
| 2,385,662 A | 9/1945 | Vonnnegut | |
| 3,173,491 A | 3/1965 | Jusyk | |
| 3,794,444 A | 2/1974 | Campbell et al. | |
| 4,129,984 A | 12/1978 | Nelson | |
| 4,650,138 A * | 3/1987 | Grose | 244/130 |
| 4,932,612 A * | 6/1990 | Blackwelder et al. | 244/207 |
| 5,114,099 A * | 5/1992 | Gao | 244/130 |
| 5,763,249 A | 6/1998 | Schultz et al. | |
| 5,988,568 A * | 11/1999 | Drews | 244/200 |
| 6,084,020 A | 7/2000 | Smith et al. | |
| 6,092,766 A * | 7/2000 | LaRoche et al. | 244/200 |
| 6,120,849 A | 9/2000 | Smith et al. | |
| 6,171,704 B1 * | 1/2001 | Mosser et al. | 428/450 |
| 6,193,191 B1 * | 2/2001 | Falcimaigne et al. | 244/130 |
| 6,362,135 B1 | 3/2002 | Greer | |
| 6,797,795 B2 | 9/2004 | Byrd | |
| 6,809,169 B2 | 10/2004 | Byrd et al. | |
| 6,835,322 B2 | 12/2004 | Yoshida et al. | |
| 7,202,321 B2 | 4/2007 | Byrd et al. | |
| 2003/0035719 A1 | 2/2003 | Wadia et al. | |
| 2004/0065092 A1 | 4/2004 | Wadia et al. | |
| 2006/0281861 A1 | 12/2006 | Putnam | |

FOREIGN PATENT DOCUMENTS

| | | |
|---|---|---|
| GB | 458862 | 12/1936 |
| WO | 2004078873 | 9/2004 |
| WO | 2006024032 | 3/2006 |

OTHER PUBLICATIONS

International Search Report issued in connection with corresponding PCT Application No. PCT/US2009/035518 on May 6, 2010.

* cited by examiner

*Primary Examiner* — Tien Dinh
(74) *Attorney, Agent, or Firm* — David J. Clement; Trego, Hines & Ladenheim, PLLC (57) ABSTRACT

A leading edge structure for use in an aerospace vehicle includes a body having a flowpath surface which defines a leading edge adapted to face an air flow during operation, and an opposed inner surface. The body is segmented into a plurality of portions having varying thermal properties and/or mechanical discontinuities, so as to promote stress concentrations in ice attached to the flowpath surface.

7 Claims, 9 Drawing Sheets

ICE SHED REDUCTION FOR LEADING EDGE STRUCTURES

BACKGROUND OF THE INVENTION

This invention relates generally to aerospace vehicle structures and more particularly to designs for improving ice shedding characteristics from such structures.

All aircraft include various "leading edge structures", i.e. exposed surfaces that face the direction of flight. These surfaces include, for example, parts of the fuselage, wings, control surfaces, and powerplants.

One common type of aircraft powerplant is a turbofan engine, which includes a turbomachinery core having a high pressure compressor, combustor, and high pressure turbine in serial flow relationship. The core is operable in a known manner to generate a flow of propulsive gas. A low pressure turbine driven by the core exhaust gases drives a fan through a shaft to generate a propulsive bypass flow. The low pressure turbine also drives a low pressure compressor or "booster" which supercharges the inlet flow to the high pressure compressor.

Certain flight conditions allow for ice build up on the leading edge structures, and in particular the fan and booster flowpath areas of the engine. These areas include the blades, spinner cone, and static vane and fairing leading edges. The FAA requires certification testing at these flight points to demonstrate the ability to maintain engine thrust once the ice sheds from the various components and ingests into the engine.

One particular leading edge structure of interest is the engine's fan splitter. The splitter is an annular ring with an airfoil leading edge that is positioned immediately aft of the fan blades. Its function is to separate the airflow for combustion (via the booster) from the bypass airflow. It is desired for the splitter and other leading edge structures to have mechanical, chemical, and thermal properties such that ice build up and shed volume is minimized during an icing event. This in turn minimizes risk of compressor stall and compressor mechanical damage from the ingested ice.

Prior art turbofan engines have splitters made from titanium, which is known to provide favorable ice shed properties. The downside of titanium is the expense and weight when compared to conventionally treated aluminum. However, conventionally treated aluminum is believed to behave poorly in an aircraft icing environment. Examples of conventionally treated aluminum include but are not limited to chemical conversion coatings and anodization.

Leading edge structures can also be protected with known coatings that are referred to as "icephobic" or "anti-ice" coatings, for example polyurethane paint or other organic coatings. These coatings have the effect of lowering adhesion forces between ice accretions and the protected component. While these coatings can improve ice shedding characteristics, their erosion resistance may be not adequate to protect leading edge structures from the scrubbing effect of airflows with entrained abrasive particles which are encountered in flight.

BRIEF SUMMARY OF THE INVENTION

These and other shortcomings of the prior art are addressed by the present invention, which provides components having icephobic plating that reduces and/or modifies ice adhesion forces to promote ice release and reduce shedding of large ice pieces.

According to one aspect, the invention provides a leading edge structure for use in an aerospace vehicle, including: (a) a body having a flowpath surface which defines a leading edge adapted to face an air flow during operation; and (b) a plurality of mechanical discontinuities formed in the flowpath surface, the mechanical discontinuities adapted to promote stress concentrations in ice attached to the flowpath surface.

According to another aspect of the invention, a splitter for a turbofan engine includes: (a) an annular body having a flowpath surface which defines a leading edge adapted to face an air flow during operation; and (b) a plurality of mechanical discontinuities formed in the flowpath surface, the mechanical discontinuities adapted to promote stress concentrations in ice attached to the flowpath surface.

According to another aspect of the invention, a leading edge structure for use in an aerospace vehicle includes a body having a flowpath surface which defines a leading edge adapted to face an air flow during operation, and an opposed inner surface. The body is segmented into a plurality of portions having varying thermal properties, so as to promote stress concentrations in ice attached to the flowpath surface.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
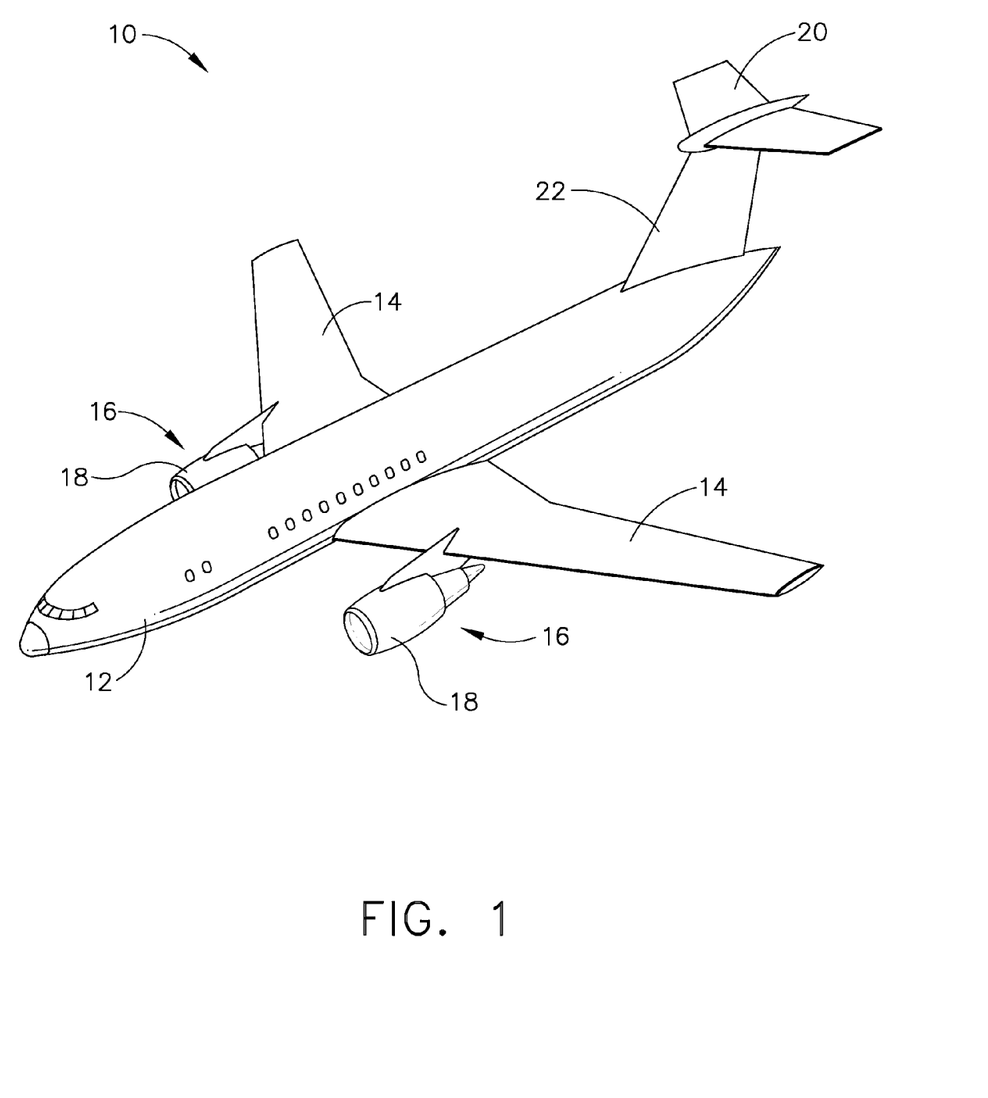
FIG. 1 is a perspective view of an aircraft powered by a pair of high-bypass turbofan engines, incorporating icing-resistant components constructed according to an aspect of the present invention.

Referring to the drawings wherein identical reference numerals denote the same elements throughout the various views, FIG. 1 depicts a known type of commercial aircraft 10 which includes a generally tubular fuselage 12, wings 14 carrying turbofan engines 16 mounted in nacelles 18, and an empennage comprising horizontal and vertical stabilizers 20 and 22. Each of these components includes one or more exposed surfaces having a curved or airfoil-like cross-section that faces the direction of flight (in other words an aerodynamic leading edge). These surfaces are referred to herein as "leading edge structures". While the present invention will be described further in the context of a gas turbine engine, it will be understood that the principles contained therein may be applied to any type of leading edge structure.

Figure 2:
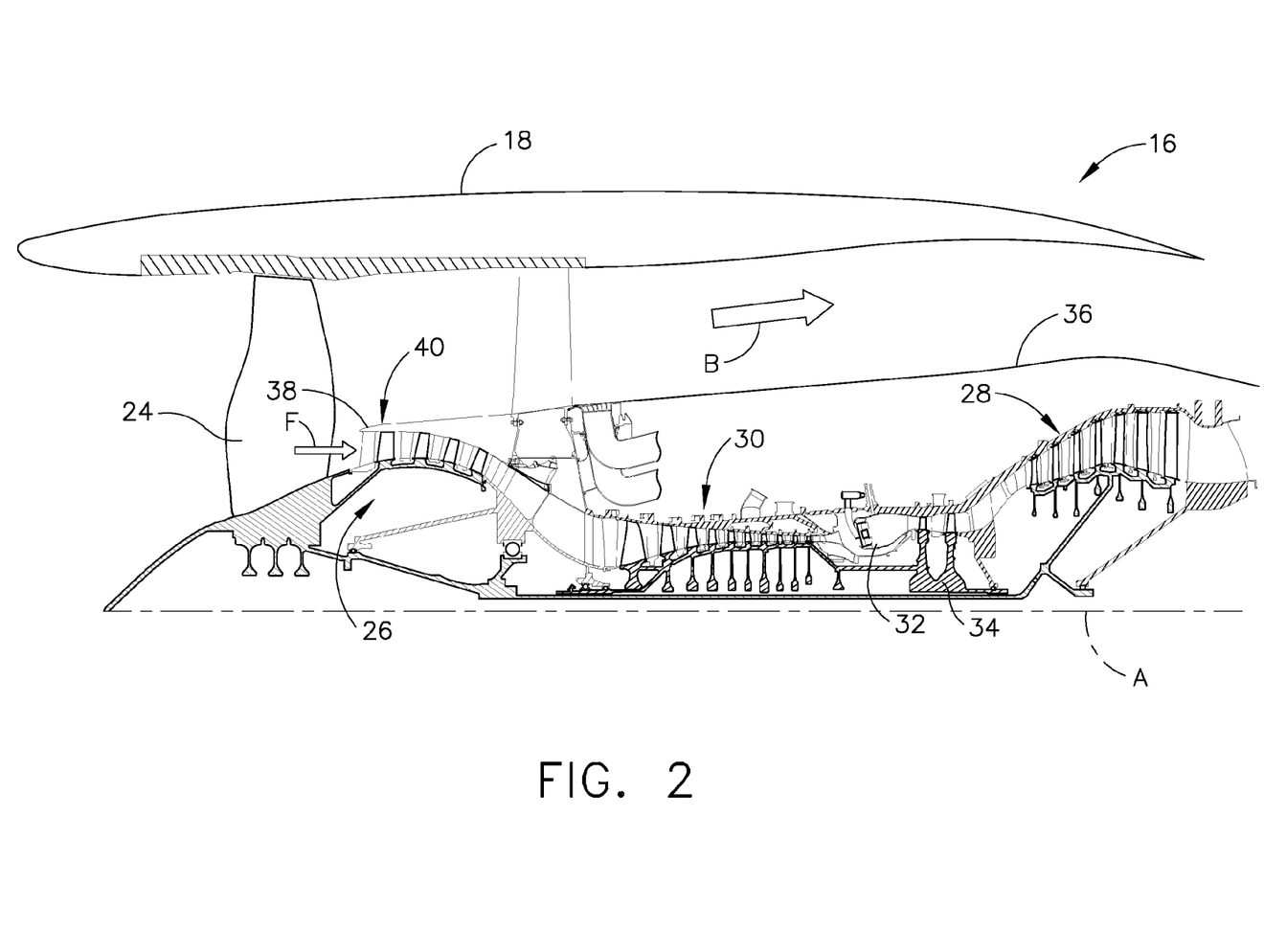
FIG. 2 is a schematic half-sectional view of an engine shown in FIG. 1.

As shown in FIG. 2, the engine 16 has a longitudinal axis "A" and includes conventional components including a fan 24, a low pressure compressor or "booster" 26 and a low pressure turbine ("LPT") 28, collectively referred to as a "low pressure system", and a high pressure compressor ("HPC") 30, a combustor 32, and a high pressure turbine ("HPT") 34, collectively referred to as a "gas generator" or "core". Various components of the nacelle 18 and stationary structures of the engine 16, including a core nacelle 36, cooperate to define a core flowpath marked with an arrow "F", and a bypass duct marked with an arrow "B".

Figure 3:
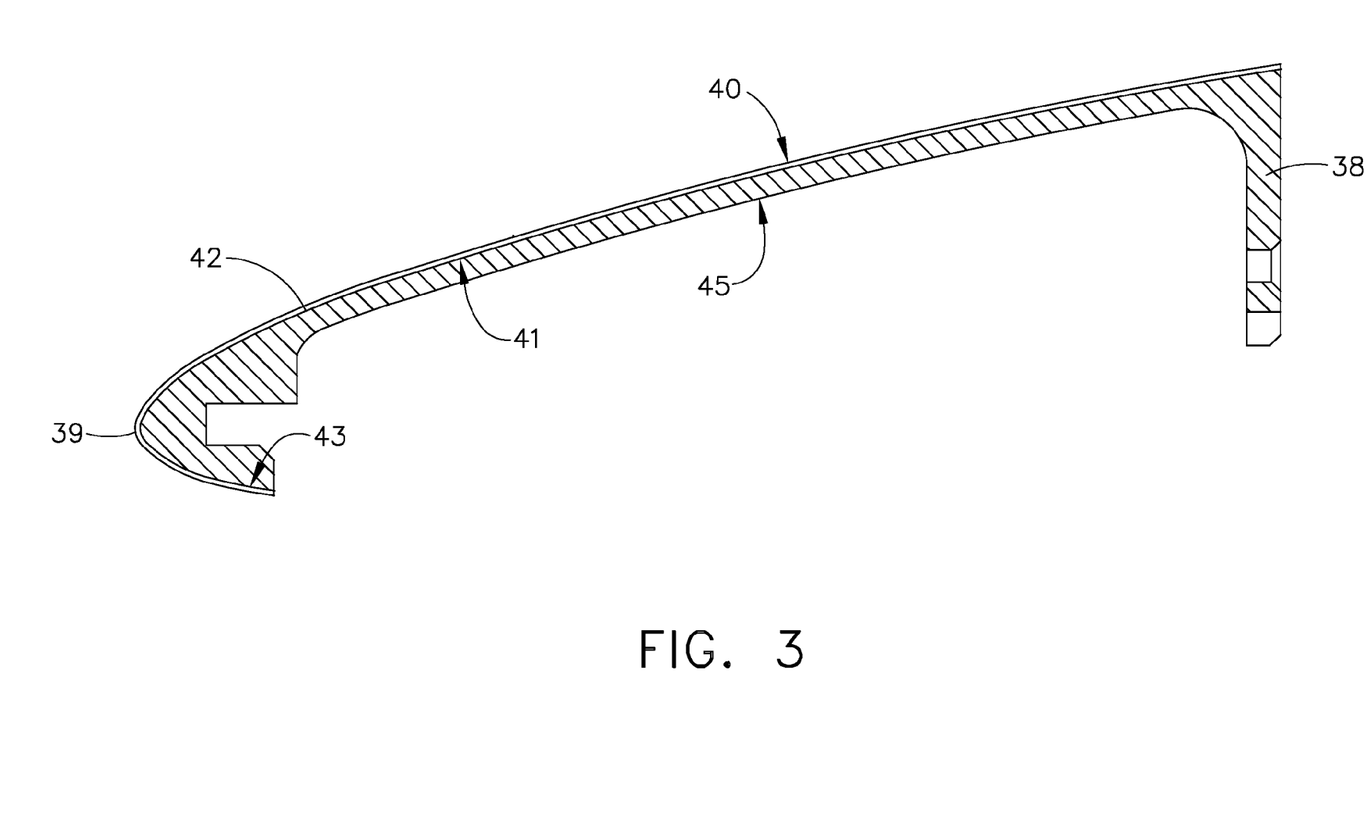
FIG. 3 is a half-sectional view of a splitter shown in FIG. 2.
Figure 4:
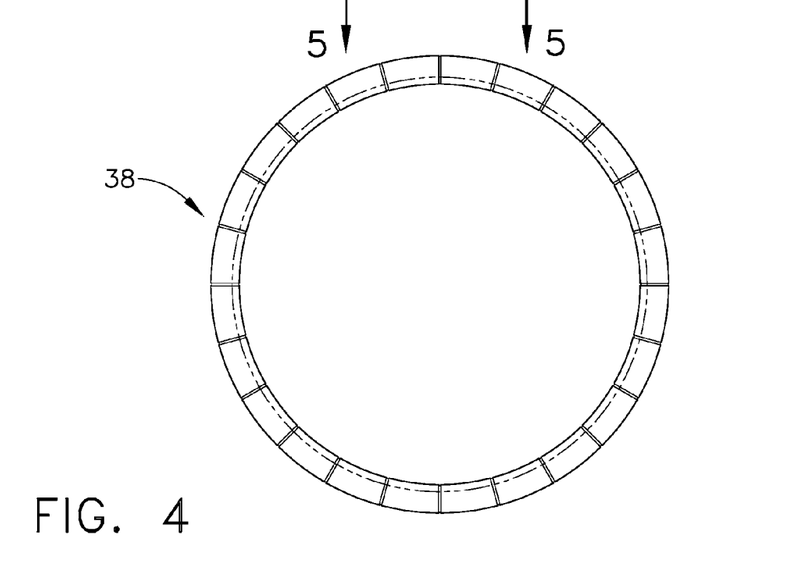
FIG. 4 is a view taken from forward looking aft at the splitter of FIG. 3.
Figure 5:
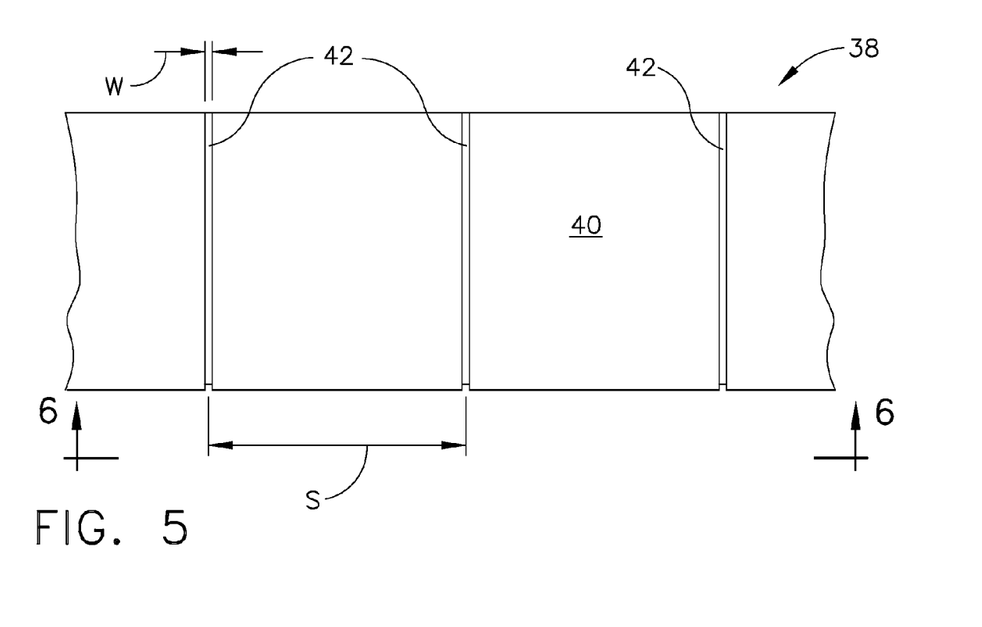
FIG. 5 is a view taken along lines 5-5 of FIG. 4.

A stationary annular splitter 38 (also seen in FIG. 3) is positioned at the forward end of the core nacelle 36, between the bypass duct B and the core flowpath F. The flowpath surface 40 of the splitter 38 includes a radially-outward-facing portion 41 and a radially-inward-facing portion 43. The two portions are demarcated by an aerodynamic leading edge 39. An inner surface 45, not exposed to the primary flowpath, is disposed opposite the flowpath surface 40. The splitter 38 is an example of a leading edge structure as described above. The splitter 38 may be a single continuous ring, or it may be built up from arcuate segments.

Figure 6A:
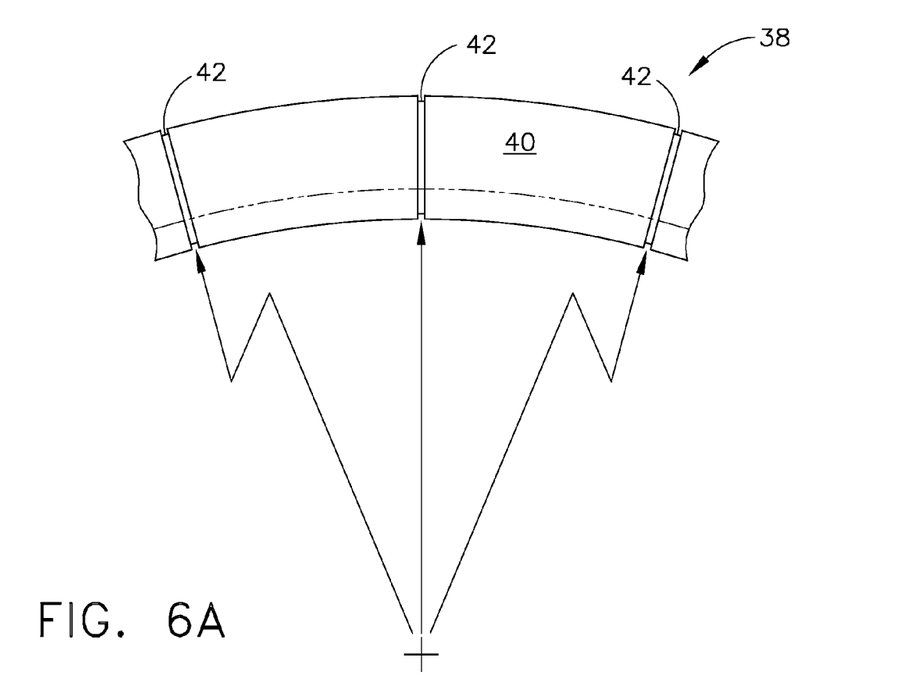
FIG. 6A is a view taken along lines 6-6 of FIG. 5.
Figure 6B:
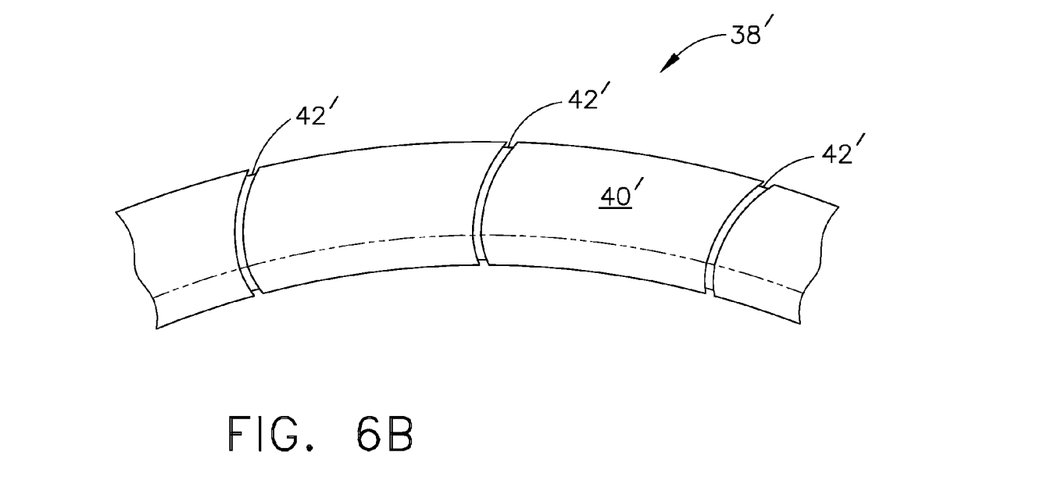
FIG. 6B is a forward looking aft view of a variation of the splitter of FIG. 6A.
Figure 7:
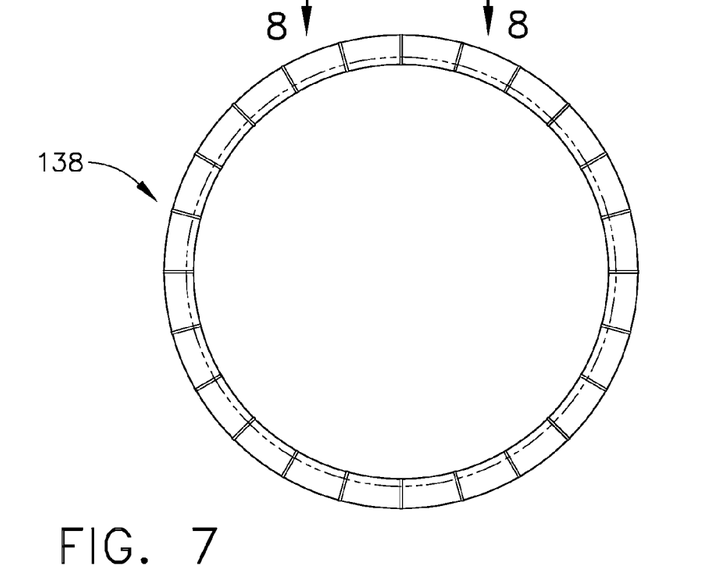
FIG. 7 is a view taken from forward looking aft at an alternative splitter.
Figure 8:
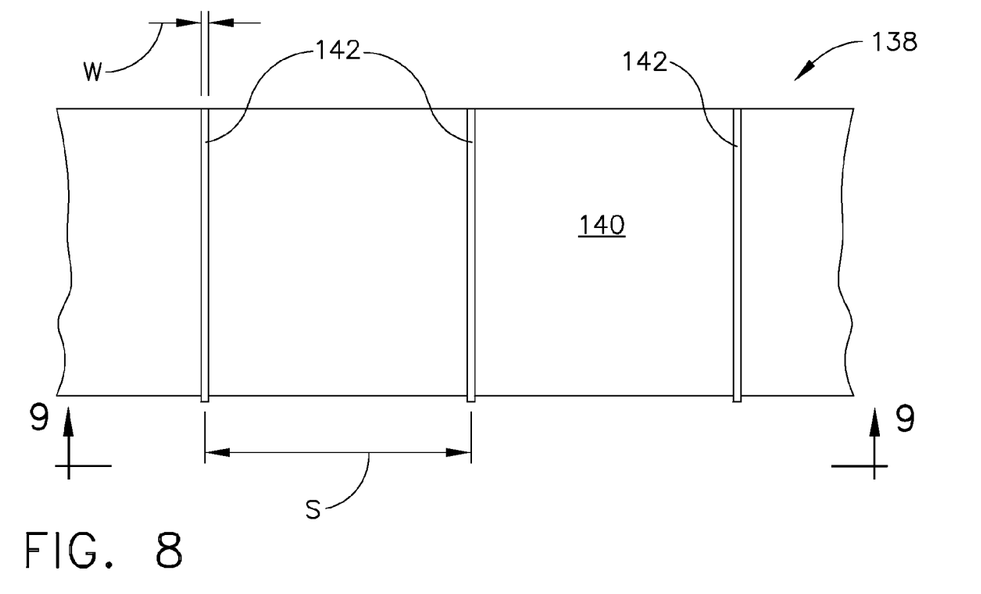
FIG. 8 is a taken along lines 8-8 of FIG. 7.
Figure 9A:
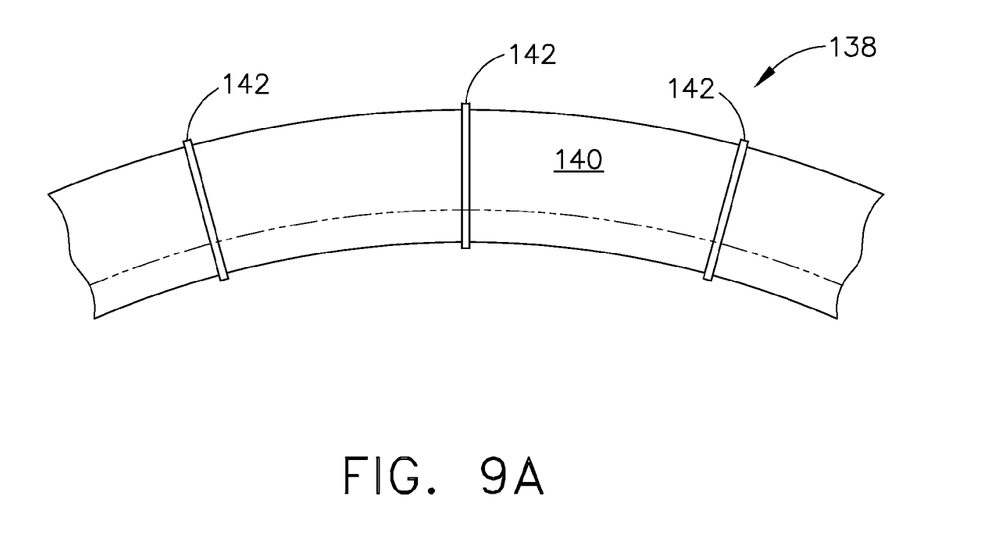
FIG. 9A is a view taken along lines 9-9 of FIG. 8.
Figure 9B:
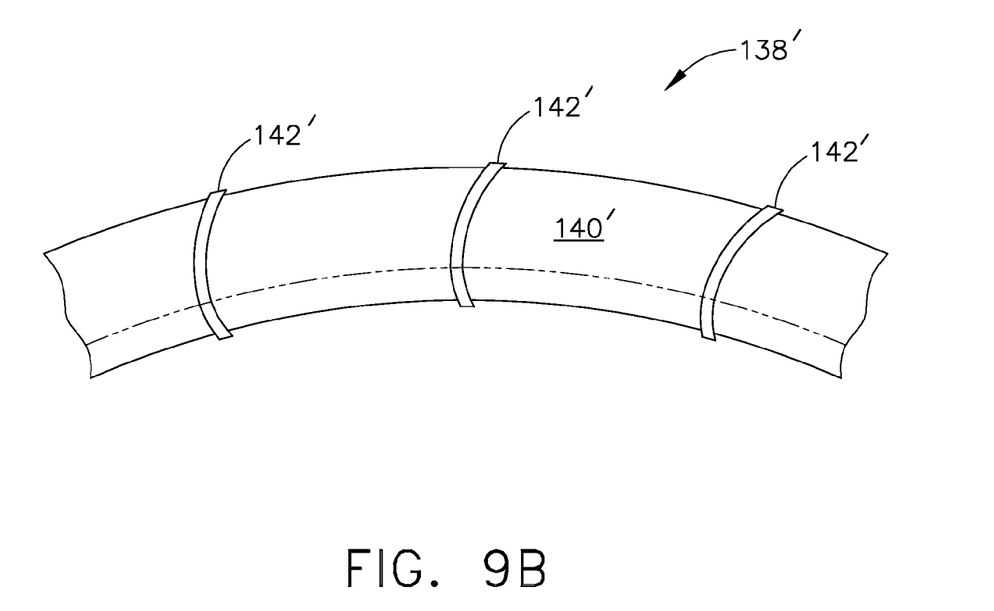
FIG. 9B is a forward looking aft view of a variation of the splitter of FIG. 9A.
Figure 10:
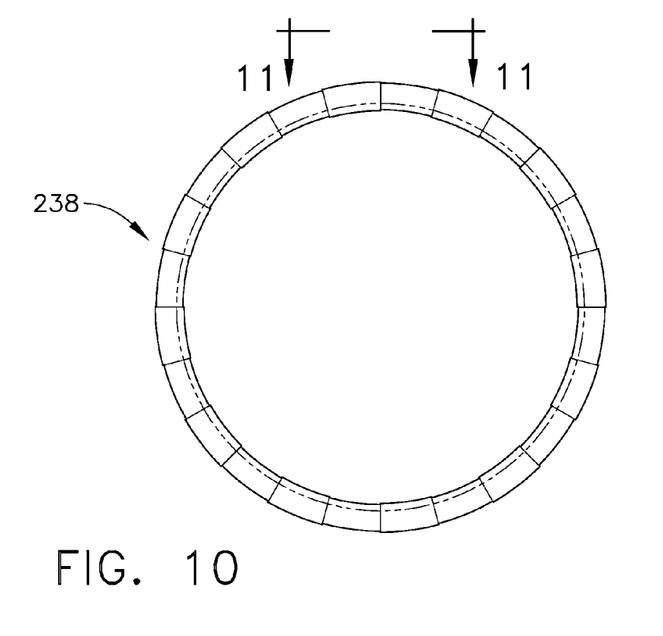
FIG. 10 is a view taken from forward looking aft at another alternative splitter.
Figure 11:
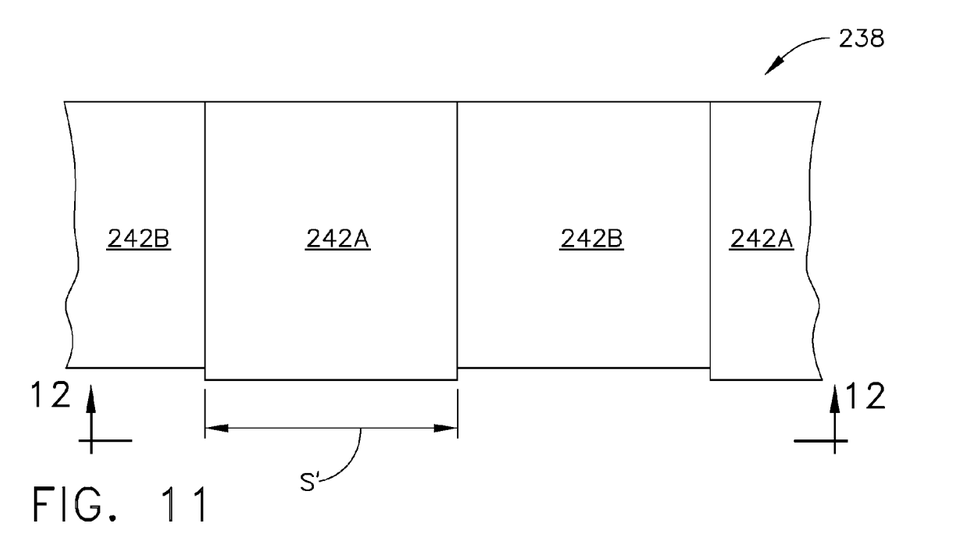
FIG. 11 is a taken along lines 11-11 of FIG. 10.
Figure 12A:
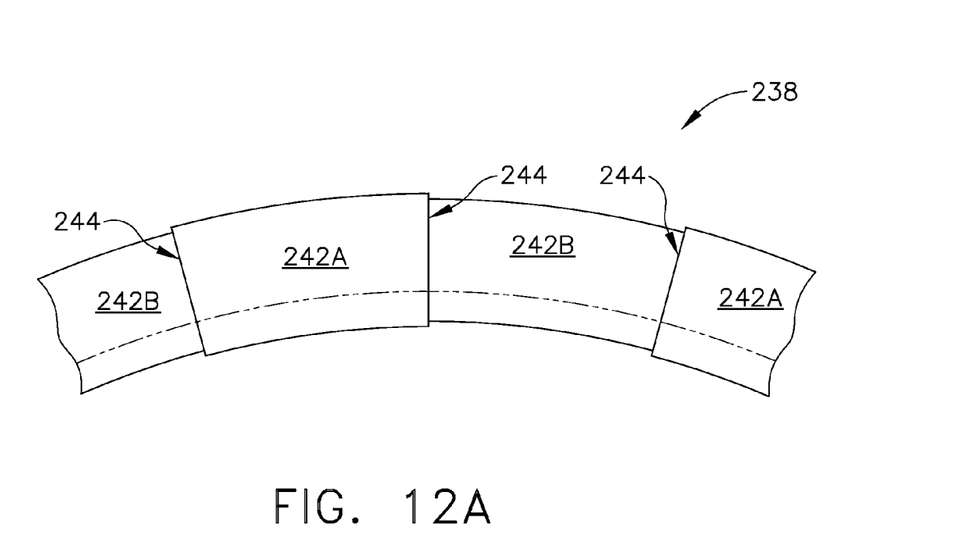
FIG. 12A is a view taken along lines 12-12 of FIG. 11.
Figure 12B:
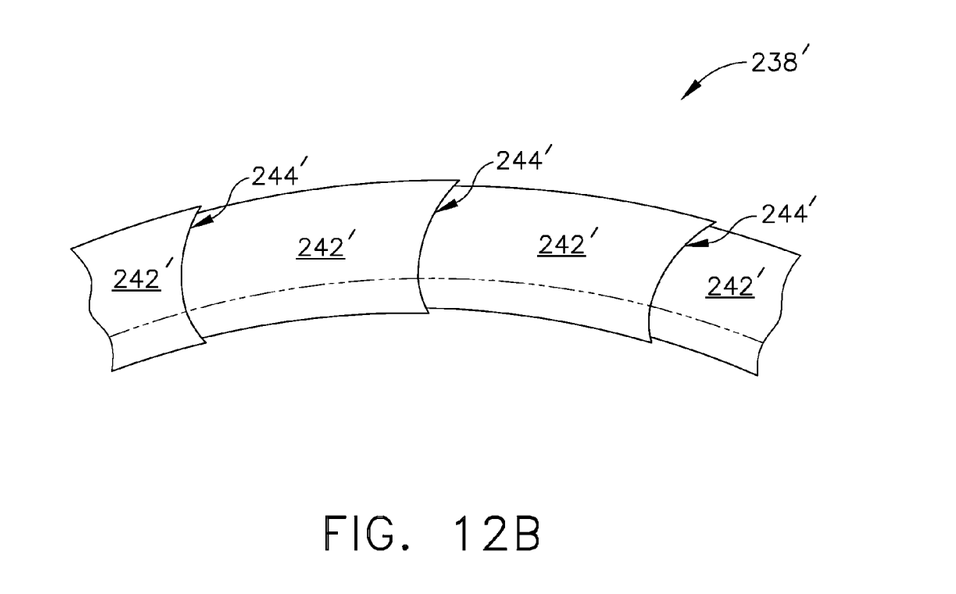
FIG. 12B is a forward looking aft view of a variation of the splitter of FIG. 12A

The flowpath surface 40 includes one or more discontinuities for the purpose of improving ice shed characteristics. As shown in FIGS. 3-6A, the splitter 38 has a radial array of generally axially aligned grooves 42 formed therein. As an example, the width "W" of the grooves may be from as small as about 0.38 mm (0.015 in.) up to as large as 50% of the circumference of the splitter 38. FIG. 6B illustrates a slightly different splitter 38' in which the flowpath surface 40' has grooves 42' that are curved. They may be curved so as to be parallel to the local flowfield during operation. FIGS. 7-9A illustrate an alternative splitter 138 that has a radial array of generally axially aligned, raised ribs 142 protruding from its flowpath surface 140. The spacing "S" of the grooves 42 or ribs 142 in the circumferential direction may be selected to cause ice to breakup into relatively small pieces. As an example, about 24 to about 140 features distributed around the circumference are believed to be suitable for this purpose. FIG. 9B illustrates a slightly different splitter 138' in which the flowpath surface 140' has ribs 142' that are curved. They may be curved so as to be parallel to the local flowfield during operation. Various patterns of grooves or ribs running in different directions (axial, circumferential, and combinations of each direction etc.) may be used.

FIGS. 10-12A illustrate another alternative splitter 238 whose flowpath surface 240 includes alternating sections 242A and 242B having substantially different thicknesses such that adjacent sections are offset in a direction normal to the flowpath surface (i.e. in the radial direction in illustrated example). The delineations between adjacent sections 242A and 242B present generally radially aligned faces 244 which act as discontinuities in the flowpath surface 240. FIG. 12B illustrates a slightly different splitter 238' in which the flowpath surface comprises segments 242' that are tapered in thickness in the circumferential direction. The delineations between adjacent sections 242' present generally radially curved faces 244' which act as discontinuities. The faces 244' may be curved so as to be parallel to the local flowfield during operation. As with the grooves or ribs, the delineations may be implemented in various patterns running in different directions (axial, circumferential, etc.)

In operation, the engine 10 will be exposed to icing conditions, namely the presence of moisture in temperatures near the freezing point of water. Ice will naturally tend to form on the leading edge structures including the splitter 38. As the ice mass builds up, it protrudes into the air flow and increasing aerodynamic (drag) forces act on it, eventually causing portions of it to shed from the splitter 38. The presence of the discontinuities described above promotes stress concentrations and introduces mechanical stresses into the ice. The result is that pieces of the ice break off and shed downstream when they are a smaller size than would otherwise be the case. This avoids excessive cooling and foreign object damage in the high pressure compressor 30.

In addition to, or as an alternative to the techniques described above, the thermal properties of the leading edge structure can be varied by changes in either alloy type or thickness. Changes to surface properties and texture may also help with heat transfer. Also, the internal (non-flowpath) surfaces can be varied in order to achieve the desired thermal variations. For example, the local thickness variation described above can be achieved by adding thickness to the inner surface, while leaving the flowpath surface unchanged).

The foregoing has described aerospace structures adapted for improved ice shedding characteristics. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only.

What is claimed is:

1. A leading edge structure for use in an aerospace vehicle, comprising:
   (a) annular body of said aerospace vehicle having a flowpath surface which defines a leading edge adapted to face an air flow during operation; and
   (b) a plurality of spaced-apart grooves formed in the flowpath surface, wherein a spacing between the grooves is substantially greater than a width of the grooves, the grooves adapted to promote stress concentrations in ice attached to the flowpath surface.

2. The leading edge structure of claim 1 wherein the grooves are curved so as to be generally parallel to the expected flowfield around the flowpath surface during operation.

3. The leading edge structure of claim 1 wherein the body comprises aluminum.

4. A splitter for a turbofan engine, comprising:
   (a) an annular body of said aerospace vehicle having a flowpath surface which defines a leading edge adapted to face an air flow during operation; and
   (b) a plurality of spaced-apart grooves formed in the flowpath surface, where a spacing between the grooves is substantially greater than a width of the grooves, the grooves adapted to promote stress concentrations in ice attached to the flowpath surface.

5. The leading edge structure of claim 4 wherein the grooves are curved so as to be generally parallel to the expected flowfield around the flowpath surface during operation.

6. The splitter of claim 4 wherein the grooves are generally axially-aligned.

7. The splitter of claim 4 wherein the body comprises aluminum.

* * * * *